(12) United States Patent
Inagaki et al.

(10) Patent No.: US 9,270,104 B2
(45) Date of Patent: Feb. 23, 2016

(54) POWER SUPPLY CONTROL DEVICE

(71) Applicant: Panasonic Corporation, Kadoma-shi, Osaka (JP)

(72) Inventors: Noboru Inagaki, Mie (JP); Shinichi Nakamura, Mie (JP); Takao Akioka, Mie (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 140 days.

(21) Appl. No.: 14/162,848

(22) Filed: Jan. 24, 2014

(65) Prior Publication Data
US 2014/0292273 A1 Oct. 2, 2014

(30) Foreign Application Priority Data

Mar. 28, 2013 (JP) .................. 2013-069916

(51) Int. Cl.
| | |
|---|---|
| *H02J 7/00* | (2006.01) |
| *H02H 3/16* | (2006.01) |
| *B60L 3/00* | (2006.01) |
| *B60L 11/18* | (2006.01) |
| *B60L 3/04* | (2006.01) |

(52) U.S. Cl.
CPC ............... *H02H 3/16* (2013.01); *B60L 3/0069* (2013.01); *B60L 3/04* (2013.01); *B60L 11/1809* (2013.01); *B60L 11/1818* (2013.01); *B60L 11/1846* (2013.01); *B60L 2230/12* (2013.01); *B60L 2230/16* (2013.01); *Y02T 10/7005* (2013.01); *Y02T 10/7088* (2013.01); *Y02T 90/121* (2013.01); *Y02T 90/14* (2013.01)

(58) Field of Classification Search
CPC ... Y02T 10/7005; Y02T 90/14; Y02T 90/122; H02J 5/005; H02J 7/025; H02J 17/00; H02J 7/0031; H02J 2007/0067; H02J 7/0021; H02J 7/0024; H02J 7/0052; H02J 7/0054; H02J 7/0063; H02J 7/022
USPC .................................................. 320/107–115
See application file for complete search history.

(56) References Cited

U.S. PATENT DOCUMENTS

| | | | |
|---|---|---|---|
| 8,421,404 B2 | 4/2013 | Nakamura et al. | |
| 2009/0235107 A1* | 9/2009 | Gelonese ....................... | 713/340 |
| 2011/0148355 A1* | 6/2011 | Nakamura et al. ............ | 320/109 |
| 2012/0049795 A1* | 3/2012 | Dougherty .................... | 320/109 |

FOREIGN PATENT DOCUMENTS

JP 2011-135653 A 7/2011

* cited by examiner

*Primary Examiner* — Binh Tat
(74) *Attorney, Agent, or Firm* — Mots Law, PLLC

(57) ABSTRACT

The power supply control device of the present invention includes: a set of power reception conductors; a set of power supply conductors; a set of intermediate conductors electrically connected to the set of power reception conductors, respectively; a set of relays configured to make and break electrical connections between the set of intermediate conductors and the set of power supply conductors, respectively; a zero-phase current transformer positioned to allow the set of intermediate conductors to pass through an inside of the zero-phase current transformer; a control circuit for controlling the set of relays responding to a detection result of the zero-phase current transformer; and a body block including a first block and a second block fixed to the first block. The set of power reception conductors and the set of power supply conductors are fixed to the first block. The set of intermediate conductors is fixed to the second block.

20 Claims, 12 Drawing Sheets

POWER SUPPLY CONTROL DEVICE

TECHNICAL FIELD

The present invention relates to power supply control devices.

BACKGROUND ART

In the past, there have been provided power supply control devices that control power supply from external power sources to automobiles (see document 1 [JP 2011-135653 A]). The external power source is, for example, a commercial 100V AC power supply. The automobile includes a battery and a charging circuit for charging the battery, is capable of running on a motor that is driven by electrical power from the battery, and specifically is a plug-in hybrid vehicle or an electric vehicle. The power supply control device is used for supplying electrical power to the charging circuit.

Some of such power supply control devices include a zero-phase current transformer in which power supply paths of all phases from an external power source to a load (e.g., a charging circuit) are inserted, and turn off relays inserted in the power supply paths to interrupt power supply from the external power source to the load responding to detection of an electrical leakage by use of the zero-phase current transformer.

In the past, a metal plate which is directly connected to an electric cable introduced from an outside and is part of the power supply path is inserted in the zero-phase current transformer (see document 1).

In the above structure where the metal plate directly connected to the electric cable is inserted in the zero-phase current transformer, when the electric cable receives external force such as pull force, the external force may be transferred to the metal plate via the electric cable and cause elastically deformation of the metal plate. Due to such deformation, the metal plate may press the zero-phase current transformer, and, as a result, displacement of the zero-phase current transformer is likely to occur.

For example, in a structure where the zero-phase current transformer is mounted on a printed wiring board, the displacement of the zero-phase current transformer is likely to cause breakage of a connection part (e.g., terminals and solder) of the zero-phase current transformer and the printed wiring board, and such breakage may cause poor connection.

SUMMARY OF INVENTION

In view of the above insufficiency, the present invention has aimed to propose a power supply control device capable of suppressing displacement of the zero-phase current transformer.

The power supply control device of the first aspect in accordance with the present invention, includes: a set of power reception conductors for receiving power; a set of power supply conductors for supplying power; a set of intermediate conductors; a set of relays; a zero-phase current transformer; a control circuit; and a body block. The set of intermediate conductors are electrically connected to the set of power reception conductors, respectively. The set of relays are configured to make and break electrical connections between the set of intermediate conductors and the set of power supply conductors, respectively. The zero-phase current transformer is positioned to allow the set of intermediate conductors to pass through an inside of the zero-phase current transformer. The control circuit is configured to, upon detecting an electrical leakage by the zero-phase current transformer, control the set of relays to break the electrical connections between the set of intermediate conductors and the set of power supply conductors. The body block holds the set of power reception conductors, the set of power supply conductors, and the set of intermediate conductors. The body block includes a first block and a second block fixed to the first block. The set of power reception conductors and the set of power supply conductors are fixed to the first block. The set of intermediate conductors is fixed to the second block.

According to the power supply control device of the second aspect in accordance with the present invention, in addition to the first aspect, the zero-phase current transformer is positioned between the first block and the second block.

According to the power supply control device of the third aspect in accordance with the present invention, in addition to the first or second aspect, the power supply control device further includes a housing accommodating the body block. The first block is fixed to the housing. The second block is not fixed to the housing directly.

According to the power supply control device of the fourth aspect in accordance with the present invention, in addition to any one of the first to third aspects, each of the set of power reception conductors is formed of a metal plate, and includes a power reception terminal for receiving power.

According to the power supply control device of the fifth aspect in accordance with the present invention, in addition to the fourth aspect, each of the power reception terminals of the set of power reception conductors has a shape allowing mechanical connection with a contact terminal of a predetermined plug.

According to the power supply control device of the sixth aspect in accordance with the present invention, in addition to the fourth or fifth aspect, each of the set of power reception conductors includes a first connection terminal and is embedded in the first block such that the power reception terminal and the first connection terminal are exposed. The set of intermediate conductors are electrically connected to the first connection terminals of the set of power reception conductors, respectively.

According to the power supply control device of the seventh aspect in accordance with the present invention, in addition to the sixth aspect, each of the set of power supply conductors is formed of a metal plate, and includes a power supply terminal for supplying power.

According to the power supply control device of the eighth aspect in accordance with the present invention, in addition to the seventh aspect, each of the power supply terminals of the set of power supply conductors has a shape allowing mechanical connection with a contact terminal of a predetermined plug.

According to the power supply control device of the ninth aspect in accordance with the present invention, in addition to the seventh or eighth aspect, each of the set of power supply conductors includes a second connection terminal and is embedded in the first block such that the power supply terminal and the second connection terminal are exposed. The set of relays are interposed between the set of intermediate conductors and the second connection terminals of the set of power supply conductors, respectively.

According to the power supply control device of the tenth aspect in accordance with the present invention, in addition to the ninth aspect, each of the set of intermediate conductors is formed of a metal plate, and includes a third connection terminal and a fourth connection terminal. Each of the set of intermediate conductors is embedded in the second block such that the third connection terminal and the fourth connection terminal are exposed. The third connection terminals of the set of intermediate conductors are electrically connected to the first connection terminals of the set of power reception conductors, respectively. The set of relays are interposed between the fourth connection terminals of the set of intermediate conductors and the second connection terminals of the set of power supply conductors, respectively.

According to the power supply control device of the eleventh aspect in accordance with the present invention, in addition to the tenth aspect, the power supply control device further includes a set of connection conductors. Each of the set of connection conductors is formed of a metal plate, and includes a fifth connection terminal and a sixth connection terminal. Each of the set of connection conductors is embedded in the first block such that the fifth connection terminal and the sixth connection terminal are exposed. The fourth connection terminals of the set of intermediate conductors are electrically connected to the fifth connection terminals of the set of connection conductors, respectively. The set of relays are interposed between the sixth connection terminals of the set of connection conductors and the second connection terminals of the set of power supply conductors, respectively.

According to the power supply control device of the twelfth aspect in accordance with the present invention, in addition to any one of the first to third aspects, each of the set of power supply conductors is formed of a metal plate, and includes a power supply terminal for supplying power.

According to the power supply control device of the thirteenth aspect in accordance with the present invention, in addition to the twelfth aspect, each of the power supply terminals of the set of power supply conductors has a shape allowing mechanical connection with a contact terminal of a predetermined plug.

According to the power supply control device of the fourteenth aspect in accordance with the present invention, in addition to any one of the first to thirteenth aspects, the power supply control device further includes: a first grounding conductor; and a second grounding conductor. Each of the first grounding conductor and the second grounding conductor is formed of a metal plate. The first grounding conductor includes a first grounding terminal for receiving power, a second grounding terminal for supplying power, and a third grounding terminal for detection of an electrical leakage. The first grounding conductor is embedded in the first block such that the first grounding terminal, the second grounding terminal, and the third grounding terminal are exposed. The second grounding conductor includes a fourth grounding terminal and a fifth grounding terminal. The second grounding conductor is embedded in the second block such that the fourth grounding terminal and the fifth grounding terminal are exposed. The second grounding conductor is positioned to pass through the inside of the zero-phase current transformer. The fourth grounding terminal of the second grounding conductor is electrically connected to the third grounding terminal of the first grounding conductor. The fifth grounding terminal of the second grounding conductor is electrically connected to the control circuit.

According to the power supply control device of the fifteenth aspect in accordance with the present invention, in addition to any one of the first to fourteenth aspects, the set of power reception conductors is to be electrically connected to an external power source. The set of power supply conductors is to be electrically connected to a charging circuit for charging a battery of an automobile.

DESCRIPTION OF EMBODIMENTS

Figure 1:
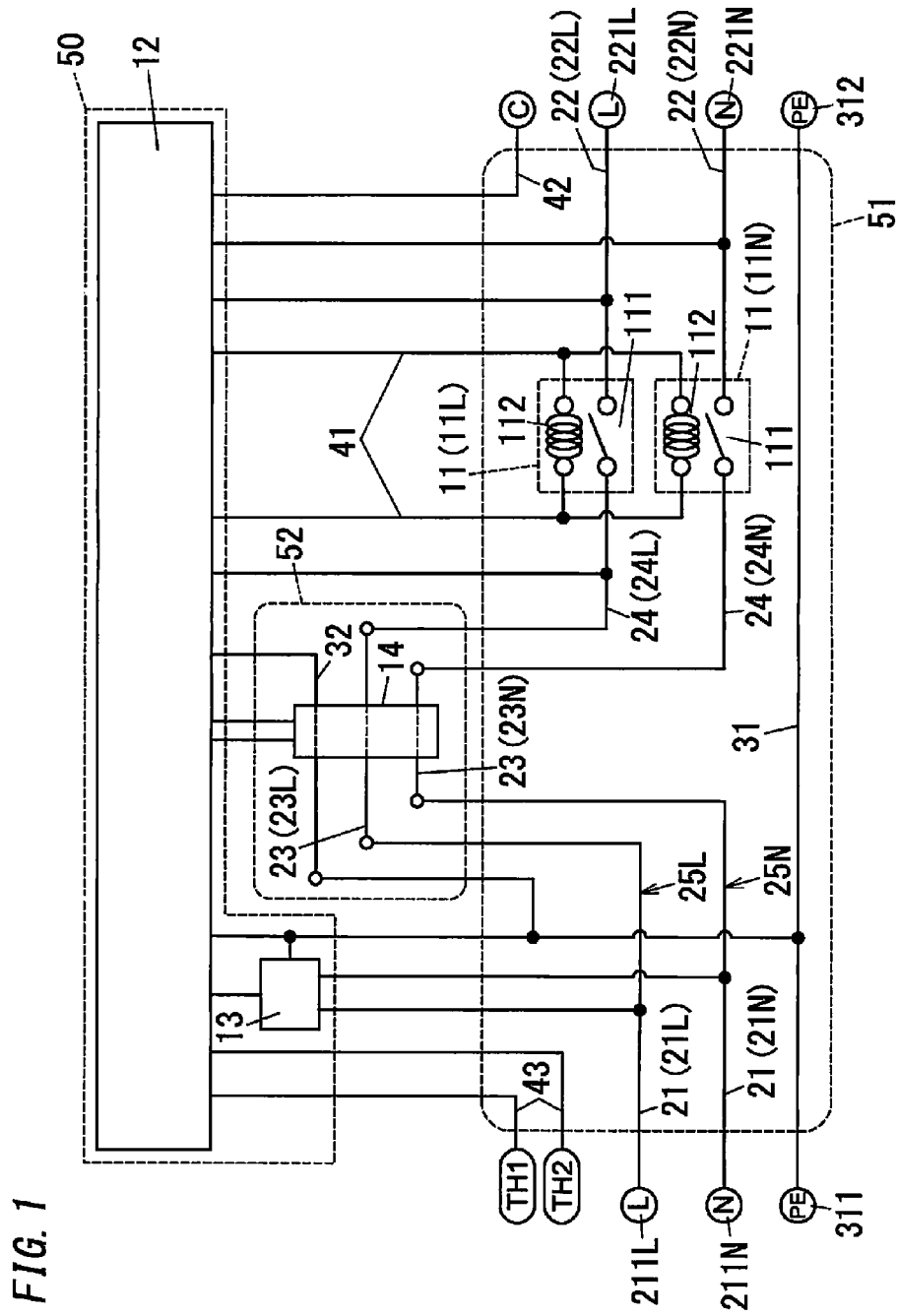
FIG. 1 is a block diagram illustrating a power supply control device of one embodiment in accordance with the present invention.

As shown in FIG. 1, the power supply control device of one embodiment in accordance with the present invention includes a set of power reception conductors (in the present embodiment, a pair of power reception conductors) 21 to be electrically connected to an external power source (not shown) and a set of power supply conductors (in the present embodiment, a pair of power supply conductors) 22 to be electrically connected to a charging circuit of an automobile (not shown) that includes a battery and a charging circuit to charge the battery. The power reception conductors 21 and the power supply conductors 22 are provided one each for line (L) and neutral (N).

In summary, the power supply control device of the present embodiment includes the set of (two) power reception conductors 21 for receiving power, and the set of (two) power supply conductors 22 for supplying power. In the following explanation, a suffix "L" is attached to components regarding the line (L) and a suffix "N" is attached to components regarding the neutral (N), if necessary.

Figure 3:
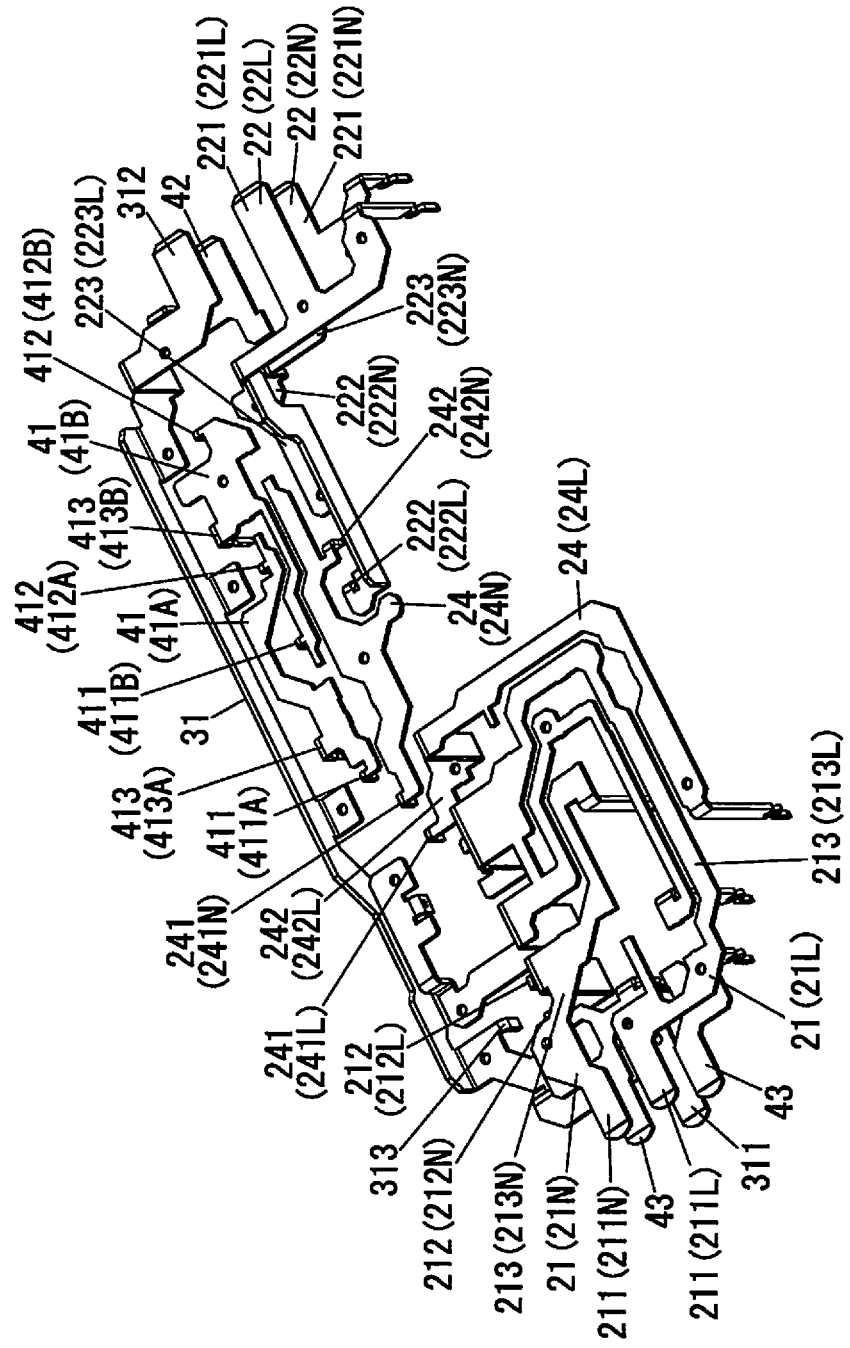
FIG. 3 is a perspective view illustrating conductors to be embedded with insert molding in a first block of the above power supply control device.

As shown in FIG. 3, each of the set of power reception conductors 21 includes a power reception terminal 211, a connection terminal (first connection terminal) 212, and an interconnecting part 213 electrically interconnecting the power reception terminal 211 and the connection terminal 212.

The power reception terminal 211 is used for receiving power. For example, the power reception terminal 211 is to be electrically connected to an external power source. The power reception terminal 211 has a shape allowing mechanical connection with a contact terminal 73 of a predetermined plug (in the present embodiment, a device-side plug 71 of a power supply-side cable 7). The first connection terminal 212 is electrically connected to a corresponding one of the set of power supply conductors 22.

As shown in FIG. 3, each of the set of power supply conductors 22 includes a power supply terminal 221, a connection terminal (second connection terminal) 222, and an interconnecting part 223 interconnecting the power supply terminal 221 and the connection terminal 222.

The power supply terminal 221 is used for supplying power. For example, the power supply terminal 221 is to be electrically connected to a charging circuit for charging a battery of an automobile. The power supply terminal 221 has a shape allowing mechanical connection with a contact terminal 83 of a predetermined plug (in the present embodiment, a device-side plug 81 of a load-side cable 8). The second connection terminal 222 is electrically connected to a corresponding one of the set of power reception conductors 21.

Moreover, the power supply control device of the present embodiment includes relays 11, one for each polarity that open and close respective electrical connections between the power reception conductors 21 and the power supply conductors 22. In brief, the power supply control device of the present embodiment includes the relay 11 configured to make and break the electrical connection between the power reception terminal 211 and the power supply terminal 221. For example, each of the relays 11 is constituted by known electromagnetic relays.

Furthermore, the power supply control device of the present embodiment includes a control circuit 12 configured to control the relays 11 and a power circuit 13 configured to generate operating power for the control circuit 12. The control circuit 12 and the power circuit 13 are mounted on the same printed wiring board 50 (see FIG. 2).

The power circuit 13 receives power from the external power source via the power reception conductors 21 and generates power necessary for the control circuit 12 to operate. The power supply circuit 13 is configured to supply power to the control circuit 12 by use of power received via the power reception terminal 211. This kind of power circuit 13 can be realized by a known AC-DC converter, for example.

The control circuit 12 is electrically connected to control terminals (that is, the terminals of electromagnet devices 112 that drive contact devices 111 of the relays 11) of the relays 11 via a pair of conductors (hereinafter referred to as "driving conductor") 41 (41A and 41B). The control circuit 12 drives (controls) the relays 11 with electrical signals input to the relays 11 via the driving conductors 41.

The conductors 41 (41A and 41B) includes first terminals 411 (411A and 411B), second terminals 412 (412A and 412B), and third terminals 413 (413A and 413B), respectively.

Figure 4:
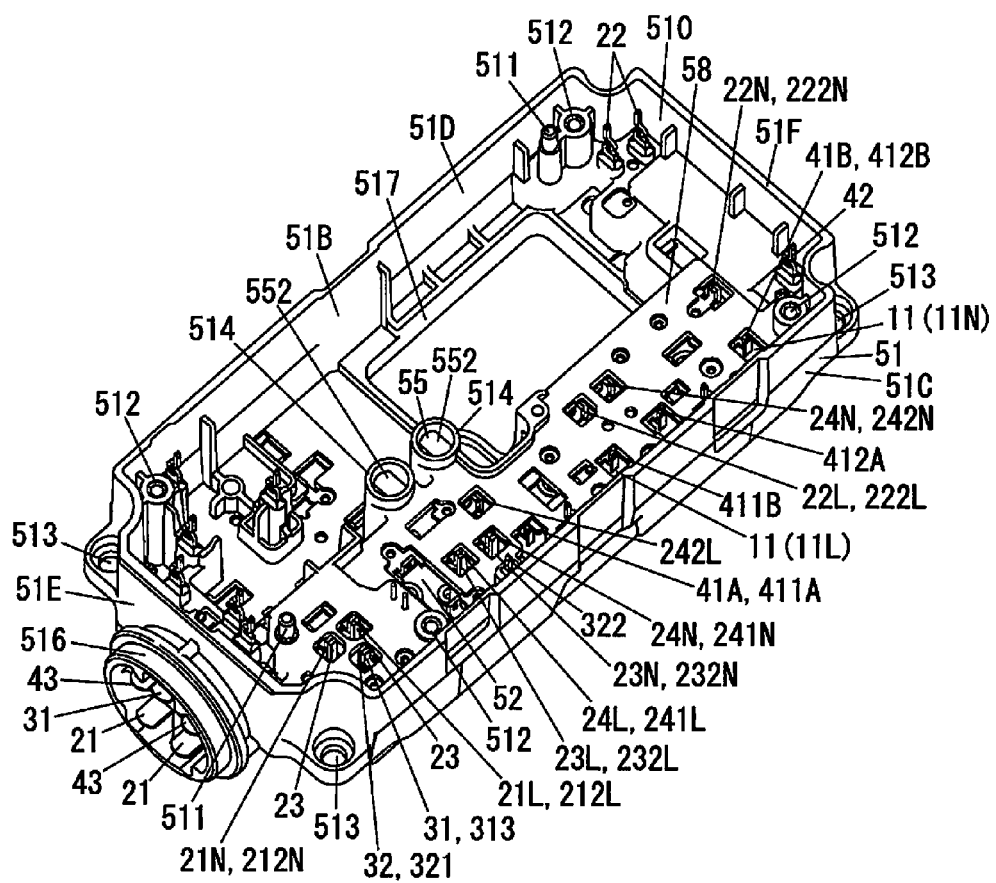
FIG. 4 is a perspective view illustrating a state in which a printed wiring board is detached from the primary part.

As shown in FIG. 4, the electromagnet device 112 of the relay 11L is connected between the first terminals 411A and 411B. The electromagnet device 112 of the relay 11N is connected between the second terminals 412A and 412B.

Note that, the third terminals 413A and 413B are connected to the control circuit 12.

Moreover, the power supply control device of the present embodiment includes a first grounding conductor 31 used as protective earth (PE).

As shown in FIG. 3, the first grounding conductor includes a first grounding terminal 311 for receiving power, a second grounding terminal 312 for supplying power, and a third grounding terminal 313 for detection of an electrical leakage.

The control circuit 12 and the power circuit 13 are electrically connected to the first grounding conductor 31.

Furthermore, the power supply control device of the present embodiment includes a conductor (also designated by "C" in FIG. 1, hereinafter referred to as "first signal conductor") 42 that is to be electrically connected to the charging circuit.

The control circuit 12 controls the relays 11 according to an electrical signal (so-called CPLT signal) that is input via the first signal conductor 42.

Moreover, the power supply control device of the present embodiment includes a pair of conductors (also designated by "TH1" and "TH2" in FIG. 1, hereinafter referred to as "second signal conductors") 43 to receive an output of a thermistor (not shown) provided to an external power source.

The control circuit 12 turns off the relays 11 when receiving a signal indicative of an abnormally high temperature via the second signal conductors 43.

Figure 2:
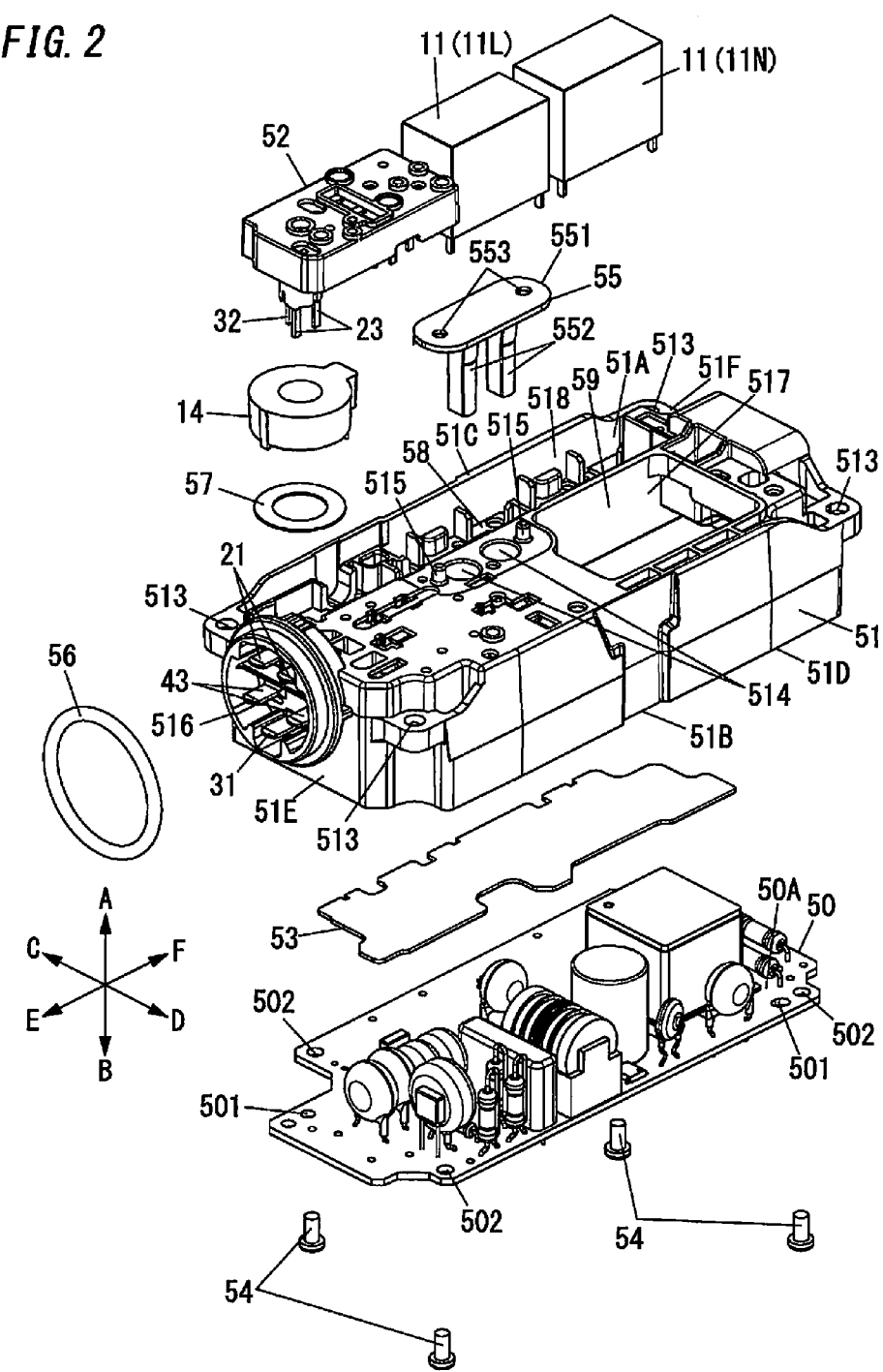
FIG. 2 is an exploded perspective view illustrating a primary part of the above power supply control device.

The conductors 21, 22, 31, 41, 42, and 43 are made of a metal plate as shown in FIG. 3, and, as shown in FIGS. 2 and 4, are held by (fixed to) a block (first block) 51 made of synthetic resin with insert molding.

For example, each of the set of power reception conductors 21 is embedded in the first block 51 such that the power reception terminal 211 and the first connection terminal 212 are exposed. Each of the set of power supply conductors 22 is embedded in the first block 51 such that the power supply terminal 221 and the second connection terminal 222 are exposed. The first grounding conductor 31 is embedded in the first block 51 such that the first grounding terminal 311, the second grounding terminal 312, and the third grounding terminal 313 are exposed.

The relays 11 and the printed wiring board 50 are fixed to the first block 51. The printed wiring board 50 is positioned such that a mounted surface 50A thereof faces the first block 51, and an insulation sheet 53 made of an insulating material such as synthetic resin is inserted between the printed wiring board 50 and the first block 51. The mounting surface 50A is defined by a surface on which the control circuit 12 and the power supply circuit 13 (electronic components of the control circuit 12 and the power supply circuit 13) are mounted.

Hereinafter, A, B, C, D, E, and F directions in FIG. 2 are referred to as upward, downward, left, right, forward, and rearward directions of the power supply control device, respectively. That is, the printed wiring board 50 is attached to a lower side of the first block 51 with the mounted surface 50A being oriented in the upward direction.

When viewed in an upward and downward direction, a whole of the first block 51 has a rectangular shape with a lengthwise direction extending along a forward and rearward direction. For example, the first block 51 has a rectangular frame shape. The first block 51 includes a first side wall 51E and a second side wall 51F facing each other in a first direction (lengthwise direction, which is identical to a direction parallel to the E and F directions in FIG. 2) and a third side wall 51D and a fourth side wall 51C facing each other in a second direction (width direction, which is identical to a direction parallel to the C and D directions in FIG. 2) perpendicular to the first direction. Further, the first block 51 includes a first open end 51A and a second open end 51B respectively defining opposite ends in a third direction (thickness direction, which is identical to a direction parallel to the A and B directions in FIG. 2) perpendicular to each of the first direction and the second direction.

In summary, the first block 51 has the first side wall (first end) 51E and the second side wall (second end) 51F respectively defining the opposite ends in the first direction (lengthwise direction, which is identical to a direction parallel to the E and F directions in FIG. 2), and the third side wall (third end) 51D and the fourth side wall (fourth end) 51C respectively defining the opposite ends in the second direction (width direction, which is identical to a direction parallel to the C and D directions in FIG. 2). Further, the first block has the first open end (fifth end) 51A and the second open end (sixth end) 51B respectively defining the opposite ends in the third direction (thickness direction, which is identical to a direction parallel to the A and B directions in FIG. 2).

Figure 5:
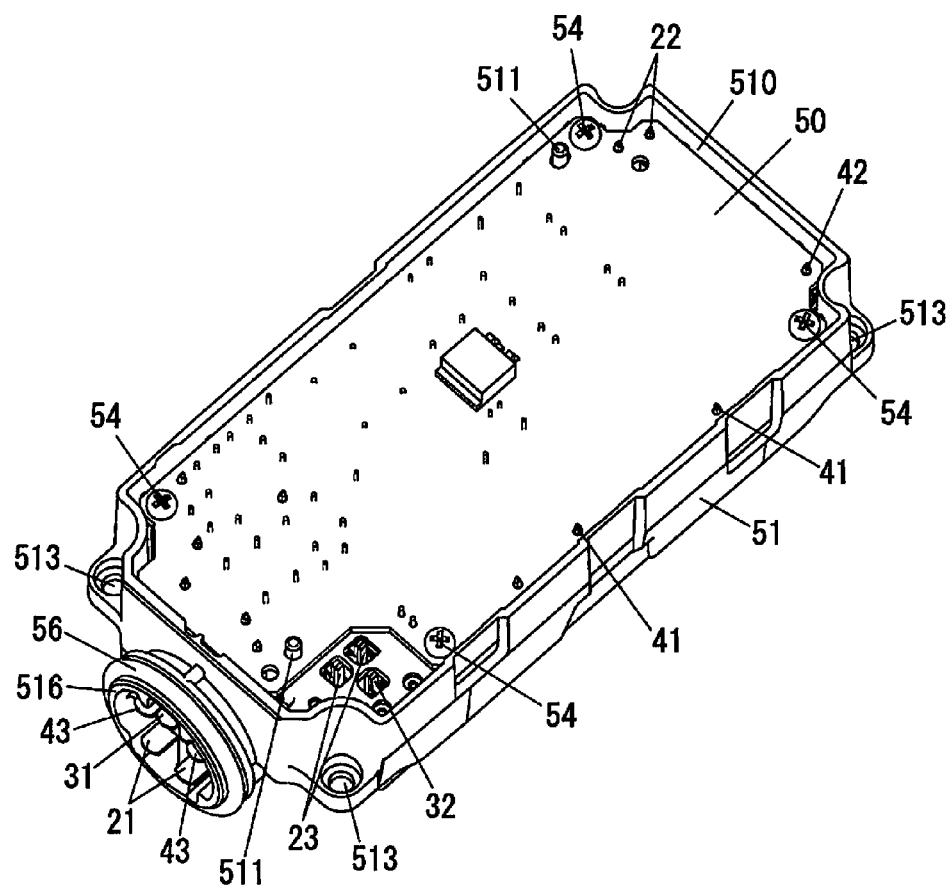
FIG. 5 is a perspective view illustrating the primary part.

As shown in FIGS. 4 and 5, the first block 51 is provided in a lower surface thereof with a housing recess 510 for accommodating the printed wiring board 50.

Provided on an inner bottom surface of the housing recess 510 are a plurality of (two, in the drawings) positioning protrusions 511. The printed wiring board 50 is positioned by inserting the positioning protrusions 511 into respective positioning holes 501 of the printed wiring board 50.

Further, provided near four corners of the inner bottom surface of the housing recess 510 are screw receiving portions 512 each formed into a cylindrical shape and including a screw hole opening downward (upward in FIG. 4).

The printed wiring board 50 is fixed to the first block 51 by screwing four screws 54 into the screw receiving portions 512 via screw passing holes 502 of the printed wiring board 50 respectively.

Furthermore, on the printed wiring board 50, two light-emitting diodes (not shown) are mounted side by side in the forward and rearward direction. The two light-emitting diodes are controlled by the control circuit 12 and used for displaying the conduction state and announcing abnormality.

The control circuit 12 announces abnormality (specifically, contact welding at relay 11) by lighting one of the light-emitting diodes, upon detecting conduction in any of the relays 11 even though the relays 11 are controlled to be turned off.

The first block 51 has two window holes 514 that allow passage of light from the light-emitting diodes one-by-one.

Further, the power supply control device of the present embodiment includes a light guide 55 that is made of a light transmissive (transparent or translucent) material (such as acrylic resin) and guides light from the light-emitting diodes.

The light guide 55 includes a main body portion 551 and leg portions 552. The main body portion 551 has a shape that is long in the forward and rearward direction and flat in the upward and downward direction, and the main body portion 551 is placed on an upper side of the first block 51. The leg portions 552 are protruding downward from the main body portion 551 and are to be inserted in the window holes 514 of the first block 51, respectively.

Furthermore, on an upper surface of the first block 51, swage protrusions 515 that protrude upward are provided at positions between which the two window holes 514 are positioned in the forward and rearward direction.

The light guide 55 is provided in respective opposite ends in the forward and rearward direction with swage holes 553. The light guide 55 is fixed to the first block 51 by inserting the swage protrusions 515 into the respective swage holes 553 and then swaging the swage protrusions 515.

As shown in FIGS. 6 to 9, the power supply control device of the present embodiment includes a housing 6 configured to accommodate the first block 51.

The housing 6 includes a body 61 and a cover 62. The body 61 is provided in a lower surface with a housing recess 610 for accommodating the first block 51. The cover 62 is coupled to a lower side of the body 61 to cover the housing recess 610.

The body 61 is provided at respective two portions positioned above the leg portions 552 of the light guide 55 with two display windows 613 allowing passage of light from the light emitting diodes. The display windows 613 are through holes filled with light transmissive resin, for example.

The first block 51 is provided in respective four corners when viewed in the upward and downward direction with screw insertion holes 513. Each of the screw insertion holes 513 has a ring-shape and allows insertion of screws 63 for fixing the first block 51 to the body 61 by screwing. Besides, a method of fixing the first block 51 to the housing 6 is not limited to screwing.

Further, interposed between a lower periphery of the housing recess 610 of the body 61 and the cover 62 is a packing 64 that has a ring-shape and is made of a soft material such as elastomer.

Fixing the cover 62 to the body 61 is achieved by screwing six screws 65 into the body 61 via respective screw insertion holes 621 of the cover 62.

Also, the cover 62 includes a ventilation hole 622 that communicates to the housing recess 610 of the body 61.

Moreover, stuck to a lower surface of the cover 62 are an inner pressure adjusting sheet 69 covering the ventilation hole 622 and an inner pressure adjusting sheet cover 66 covering the inner pressure adjusting sheet 69. The inner pressure adjusting sheet 69 is made of a known porous material and ensures waterproofness and dust proofness along with breathability.

Further, stuck to the lower surface of the cover 62 are labels 67 and 68 describing various kinds of information.

The body 61 is provided at the front end thereof with a power supply connection portion 611 that has a cylinder-shape and connects an inside and an outside of the housing recess 610 of the body 61. Also, the body 61 is provided at a rear end thereof with a load connection portion 612 that has a cylinder-shape and connects the inside and the outside of the housing recess 610 of the body 61.

Each of the power reception conductors 21, the first grounding conductor 31, and the second signal conductors 43 has a front end portion, which is exposed inside the power supply connection portion 611 while a thickness direction thereof is identical to the upward and downward direction.

The first block 51 is provided at a front end (first side wall) 51E thereof with a protrusion 516 that has a ring-shape and is inserted in the power supply connection portion 611. Interposed between an outer periphery of this protrusion 516 and an inner surface of the body 61 is an O-ring 56 made of a soft material such as elastomer.

Besides, an electrical connection between the power supply control device of the present embodiment and the external power source is made via a power supply-side cable 7. The power supply-side cable 7 is provided at one end with a device-side plug 71 to be fitted into the power supply connection portion 611, and is provided at the other end with a power supply-side plug 72 to be inserted in and connected to an outlet (not shown) of the external power source.

Figure 10:
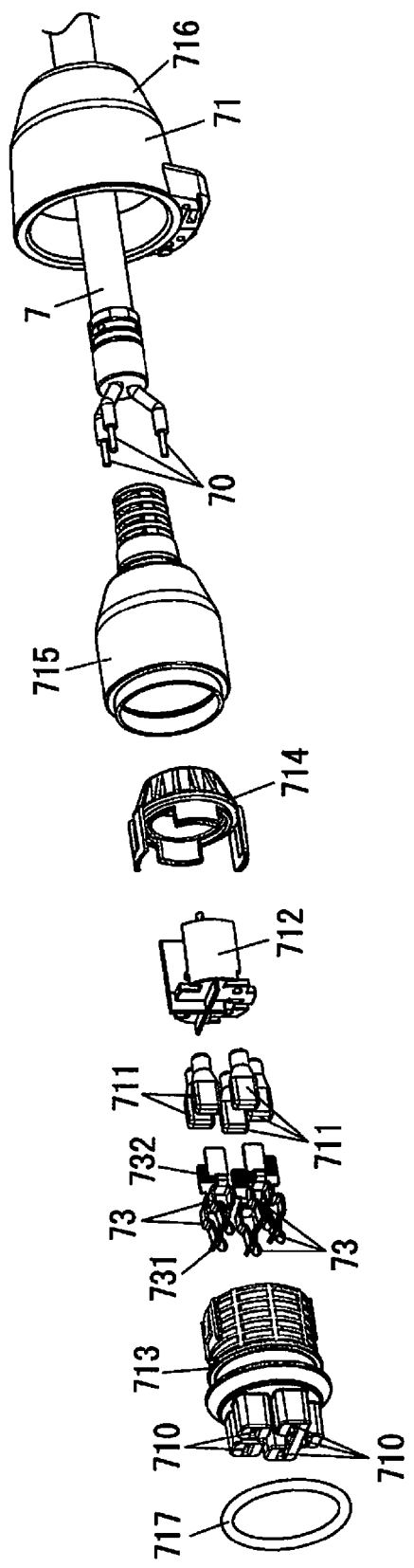
FIG. 10 is an exploded perspective view illustrating a device-side plug provided to a power supply-side cable of the above power supply control device.

As shown in FIG. 10, the device-side plug 71 includes the five contact terminals 73 each of which is a conductor such as a metal plate.

Each contact terminal 73 includes a contact portion 731 to be in physical and electrical contact with any one of the conductors 21, 31 and 43 which are exposed inside the power supply connection portion 611, and a terminal portion 732 to be in physical and electrical contact with a corresponding one of electric wires 70 included in the power supply-side cable 7. FIG. 10 illustrates only three of the electric wires 70.

The power supply-side cable 7 has the electric wires 70 which include a line electric wire 70 and a neutral electric wire 70 which are used as power supply wires and are to be electrically connected to the power reception conductors 21 via the contact terminals 73 respectively.

The contact portion 731 has such a clip-like structure that it includes pieces for elastically holding a corresponding one of the conductors 21, 31, and 43 therebetween in the thickness direction (in the upward and downward direction).

Further, the device-side plug 71 has a heat-shrinkable tube 711 with a tubular shape. When heated while the terminal portion 732 of the contact terminal 73 and the electric wire 70 are inserted in the heat-shrinkable tube 711, the heat-shrinkable tube 711 shrinks so as to hold physical contact between the terminal portion 732 of the contact terminal 73 and the electric wire 70.

The device-side plug 71 includes a holding member 712. The holding member 712 is made of synthetic resin, for example, and holds the contact terminals 73.

The device-side plug 71 includes a body 713 provided in a front side thereof (i.e. the side oriented toward an opposite direction to the housing 6; the right side in FIG. 10) with a recess (not shown) for accommodating the contact terminals 73, the heat-shrinkable tubes 711 and the holding member 712

The body 713 is provided in a rear side thereof (i.e. the side facing the housing 6; the left side in FIG. 10) with five insertion openings 710 connected to the above recess and each configured to receive one end of any one of the conductors 21, 31 and 43.

The device-side plug 71 includes a holder 714 having a ring-shape so as to surround the power supply-side cable 7. The holder 714 is configured to prevent detachment of the holding member 712 and so on from the recess while connected to the front side of the body 713.

The device-side plug 71 includes a cover 715 which is formed by double molding around an assembly in which the cable 7 is inserted through the holder 714 and the body 713 and the holder 714 are coupled with each other.

The cover 715 has portions with which a gap between the holder 714 and the body 713 and a gap between the holder 714 and the power supply-side cable 7 are filled.

The device-side plug 71 includes a cap 716 and an O-ring 717. The cap 716 has a tubular shape and is configured to receive the cover 715. The O-ring 717 has a ring-shape so as to surround the cover 715, and is made of a soft material such as elastomer. The O-ring 717 is seated between an inner periphery of the power supply connection portion 611 and the cover 715.

Figure 6:
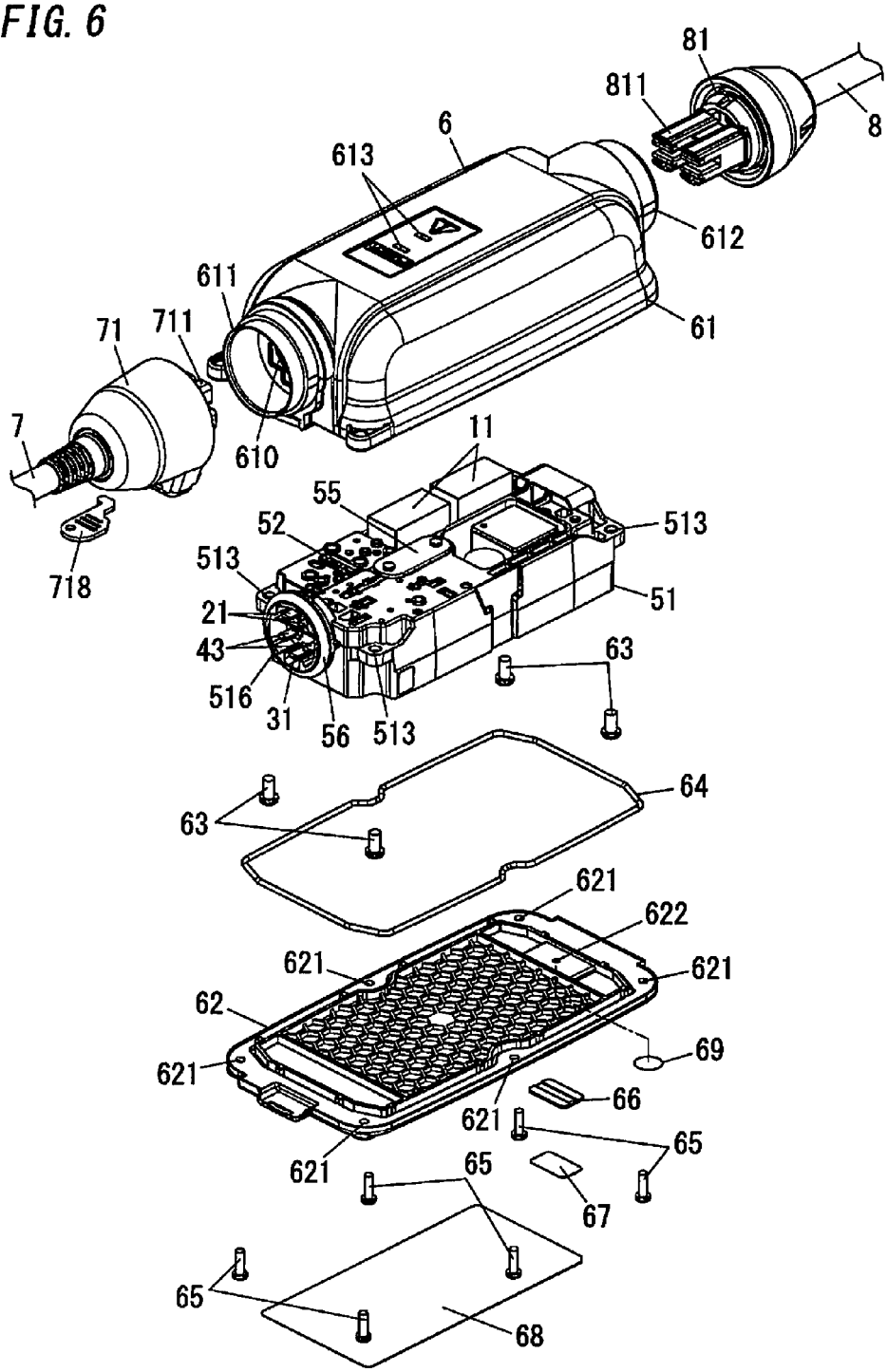
FIG. 6 is an exploded perspective view illustrating the above power supply control device.
Figure 7:
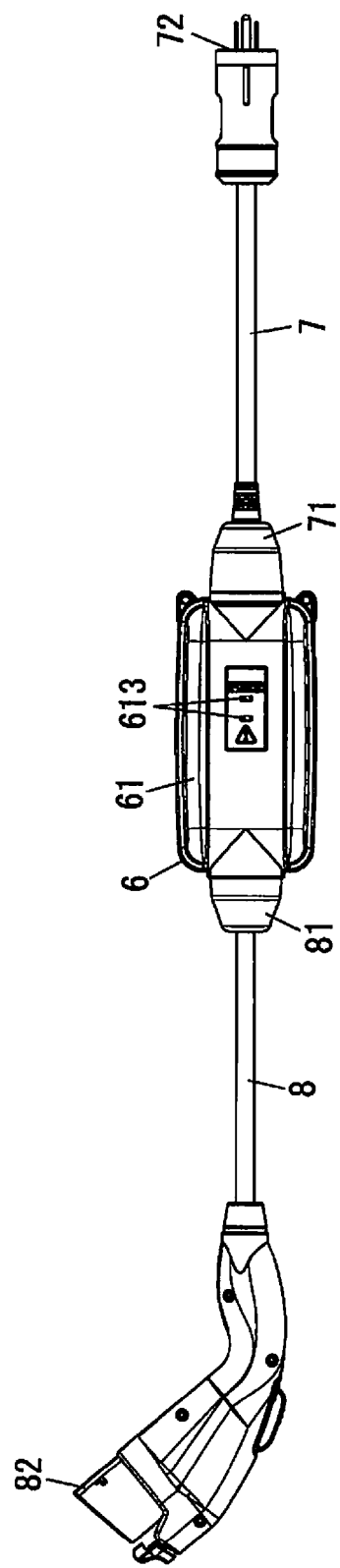
FIG. 7 is a plan view illustrating the above power supply control device.
Figure 8:
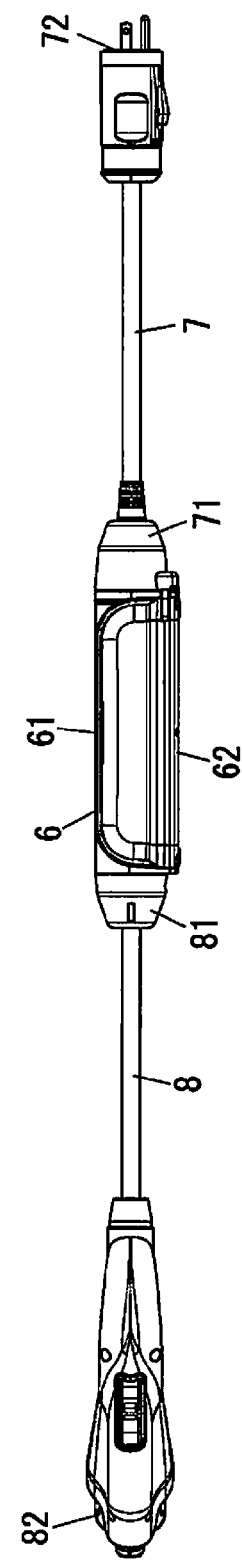
FIG. 8 is a front view illustrating the above power supply control device.
Figure 9:
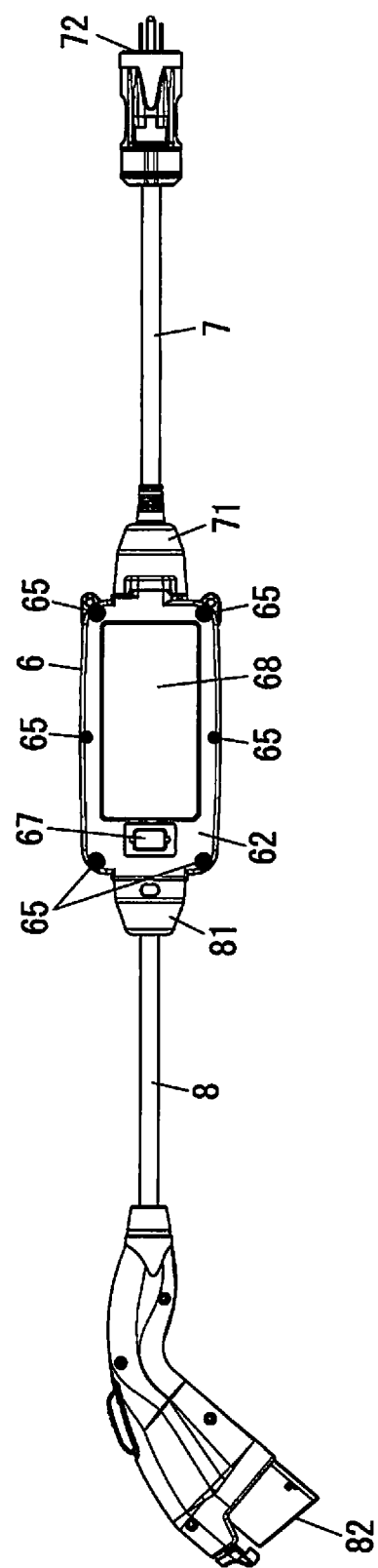
FIG. 9 is a bottom view illustrating the above power supply control device.

The cap 716 is provided with a latch mechanism (not shown) that prevents separation thereof from the housing 6. In FIG. 6, a release key 718 for releasing the latching by the latch mechanism is depicted.

Each of the power supply conductors 22, the first grounding conductor 31, and the first signal conductor 42 has a rear end portion, which is exposed inside the load connection portion 612 while a thickness direction thereof is identical to the upward and downward direction.

Further, an electrical connection between the power supply control device of the present embodiment and the charging circuit of an automobile is achieved via a load-side cable 8. The load-side cable 8 is provided at one end with a device-side plug 81 to be fitted in the load connection portion 612, and is provided at the other end with a load-side plug 82 to be inserted in and connected to a socket (not shown) of the automobile.

The device-side plug 81 of the load-side cable 8 includes the four contact terminals 83 that are kept in physical and electrical contact with the power supply conductors 22, the first grounding conductor 31, and the first signal conductor 42, respectively, while the device-side plug 81 is fitted into the load connection portion 612.

Each of the contact terminals 83 is a clip-shaped metal plate, and has portions for elastically holding corresponding one of the conductors 22, 31, and 42 therebetween in the thickness direction, for example.

The load-side cable 8 has electric wires (not shown) including a line electric wire and a neutral electric wire to be electrically connected to the power supply conductors 22 via the contact terminals 83, respectively.

Moreover, the power supply control device of the present embodiment includes a zero-phase current transformer 14 that is stuck on the upper surface of the first block 51 with double-sided tape 57 (see FIG. 2).

Furthermore, the power supply control device of the present embodiment includes a set of intermediate conductors (in the present embodiment, a pair of intermediate conductors) 23 and a second grounding conductor 32. The pair of intermediate conductors 23 are in physical and electrical contact with the respective power reception conductors 21. The second grounding conductor 32 is in physical and electrical contact with the first grounding conductor 31.

Each of the set of (two) intermediate conductors 23 includes a connection terminal (third connection terminal) 231 and a connection terminal (fourth connection terminal) 232. The third connection terminals 231 of the set of intermediate conductors 23 are electrically connected to the first connection terminals 212 of the set of power reception conductors 21, respectively. The set of relays 11 (contact devices 111) are interposed between the fourth connection terminals 232 of the set of intermediate conductors 23 and the second connection terminals 222 of the set of power supply conductors 22, respectively.

The second grounding conductor 32 includes a fourth grounding terminal 321 and a fifth grounding terminal 322. The fourth grounding terminal 321 is electrically connected to the third grounding terminal 313 of the first grounding conductor 31. The fifth grounding terminal 322 is electrically connected to the control circuit 12.

Figure 11:
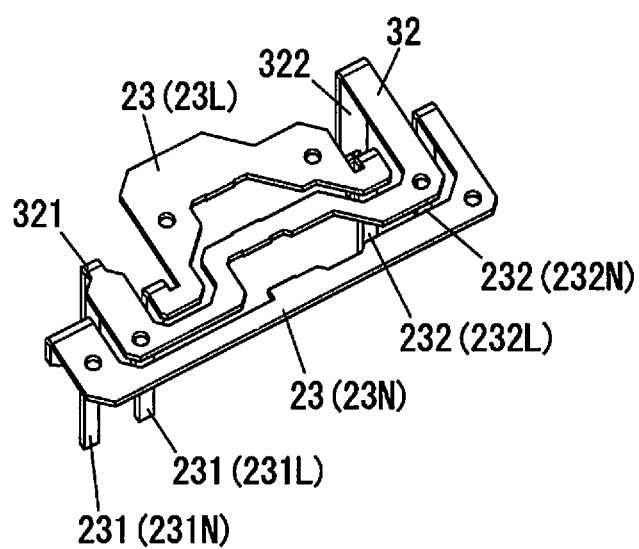
FIG. 11 is a perspective view illustrating conductors to be embedded with insert molding in a second block of the above power supply control device.

As shown in FIG. 11, each of the intermediate conductors 23 and the second grounding conductor 32 is made of a belt-shaped metal plate, and has a U shape as a whole in which a center portion thereof is turned such that a thickness direction thereof is identical to the upward and rearward direction and both ends thereof are bent downward.

The intermediate conductors 23 and the second grounding conductor 32 are embedded in the second block 52 of synthetic resin by insert molding so as to be securely insulated from each other and integrated.

For example, each of the set of intermediate conductors 23 is embedded in the second block 52 such that the third connection terminal 231 and the fourth connection terminal 232 are exposed. The second grounding conductor 32 is embedded in the second block 52 such that the fourth grounding terminal 321 and the fifth grounding terminal 322 are exposed.

In the power supply control device of the present embodiment, the first block 51 and the second block 52 constitute a body block 5. As described above, the first block 51 is fixed to the housing 6 (body 61) with the screws 63. In contrast, the second block 52 is fixed to the opposite surface of the first block 51 from the cover 62. For example, the second block 52 is connected to the first block 51 by engaging the second block 52 and the first block 51 with each other, for example, such that the zero-phase current transformer 14 is between the first block 51 and the second block 52. Consequently, the second block 52 is fixed to the first block 51 but is not fixed to the housing 6 directly.

The zero-phase current transformer 14 positioned between the first block 51 and the second block 52 to allow the set of intermediate conductors 23 to pass through an inside of the zero-phase current transformer 14. Further, the second grounding conductor 32 is positioned to pass through the inside of the zero-phase current transformer 14.

Moreover, a set of connection conductors (in the present embodiment, two connection conductors) 24 made of a metal plate are fixed to the first block 51 by insert molding. Each of the connection conductors 24 has one end to be electrically connected to the contact of corresponding one of the relays 11 and the other end to be in physical and electrical contact with corresponding one of the intermediate conductors 23.

Each of the set of connection conductors 24 includes a connection terminal (fifth connection terminal) 241 and a connection terminal (sixth connection terminal) 242. Each of the set of connection conductors 24 is embedded in the first block 51 such that the fifth connection terminal 241 and the sixth connection terminal 242 are exposed. The fourth connection terminals 232 of the set of intermediate conductors 23 are electrically connected to the fifth connection terminals 241 of the set of connection conductors 24, respectively. The set of relays 11 (the contact devices 111 of the set of relays 11) are interposed between the sixth connection terminals 242 of the set of connection conductors 24 and the second connection terminals 222 of the set of power supply conductors 22, respectively.

That is, the power reception conductors 21 are each electrically connected to one power supply conductor 22 via one intermediate conductor 23, one connection conductor 24, and one relay 11.

In summary, in the power supply control device of the present embodiment, the interconnecting part 213L, the first connection terminal 212L, the intermediate conductor 23L, the connection conductor 24L, the relay 11L (the contact device 111 of the relay 11L), the second connection terminal 222L, and the interconnecting part 223L constitute an electrical circuit 25 (25L) electrically connecting the power reception terminal 211L and the power supply terminal 221L. The interconnecting part 213N, the first connection terminal 212N, the intermediate conductor 23N, the connection conductor 24N, the relay 11N (the contact device 111 of the relay 11N), the second connection terminal 222N, and the interconnecting part 223N constitute an electrical circuit 25 (25N) electrically connecting the power reception terminal 211N and the power supply terminal 221N.

The electrical connection between the power reception conductor 21 and the power supply conductor 22 is opened and closed depending on opening and closing of the electrical connection between the connection conductor 24 and the power supply conductor 22 by the relay 11. In brief, the relay 11 is configured to make and break the electrical connection between the power reception terminal 211 and the power supply terminal 221 by opening and closing the electrical circuit 25.

In the power supply control device of the present embodiment, the first block 51 holds the power reception terminals 211, the power supply terminals 221, the relays 11, the printed wiring board 50, and the electrical circuit 25.

As shown in FIG. 2, the power reception terminal 211 and the power supply terminal 221 are positioned at the first side wall (first end, which is identical to the front end in FIG. 2) 51E and the second side wall (second end, which is identical to the rear end) 51F, respectively. Especially, the power reception terminal 211 and the power supply terminal 221 are positioned on a straight line extending in the first direction (lengthwise direction of the first block 51, which is identical to a direction parallel to the E and F directions in FIG. 2).

As shown in FIGS. 3 and 4, each electrical circuit 25 is positioned closer to the third end (third side wall) 51D than the fourth end (fourth side wall) 51C such that a circuit accommodating space 517 is formed closer to the third end (third side wall) 51D than the fourth end (fourth side wall) 51C.

For example, each power reception conductor 21 is formed such that the power reception terminal 211 is positioned at the first side wall 51E and the first connection terminal 212 is positioned closer to the fourth side wall 51C than the third side wall 51D. Each power supply conductor 22 is formed such that the power supply terminal 221 is positioned at the second side wall 51F and the second connection terminal 222 is positioned closer to the fourth side wall 51C than the third side wall 51D. The first grounding conductor 31 is formed such that the first grounding terminal 311 and the second grounding terminal 312 are positioned at the first side wall 51E and the second side wall 51F respectively and a part interconnecting the first grounding terminal 311 and the second grounding terminal 312 is positioned closer to the fourth side wall 51C than the third side wall 51D. Each intermediate conductor 23, each connection conductor 24, and the second grounding conductor 32 are positioned closer to the fourth side wall 51C than the third side wall 51D. Accordingly, the circuit accommodating space 517 is formed closer to the third end (third side wall) 51D than the fourth end (fourth side wall) 51C.

The circuit accommodating space 517 is defined as a space for accommodating the control circuit 12 and the power supply circuit 13 (the electronic components of the control circuit 12 and the power supply circuit 13). The printed wiring board 50 is positioned closer to the sixth end (second open end) 51B than the fifth end (first open end) 51A such that the mounting surface 50A faces the fifth end (first open end) 51A. Accordingly, the control circuit 12 and the power supply circuit 13 are in the circuit accommodating space 517.

As shown in FIG. 2, the first block 51 includes a relay accommodating space 518 in which the relays 11 are positioned. The relay accommodating space 518 is positioned closer to the fourth end (fourth side wall) 51C than the third end (third side wall) 51D. In the power supply control device of the present embodiment, the set of relays 11 are accommodated in the relay accommodating space 518 to be arranged side by side in the lengthwise direction of the first block 51.

Further, as shown in FIGS. 2 and 3, the first block 51 includes a supporting member 58 supporting the relays 11. The supporting member 58 has a flat plate shape, for example. The supporting member 58 is positioned closer to the sixth end (second open end) 51B than the fifth end (first open end) 51A and defines a bottom of the relay accommodating space 518. The power supply conductor 22 and the connection conductor 24 which are part of the electrical circuit 25 are embedded in the supporting member 58 partially. In brief, at least one part of each electrical circuit 25 is embedded in the supporting member 58.

Furthermore, as shown in FIGS. 2 and 3, the first block 51 includes a partition 59. The partition 59 is interposed between the circuit accommodating space 517 and the relay accommodating space 518. In brief, the partition 59 divides an internal space of the first block 51 into the circuit accommodating space 517 and the relay accommodating space 518. For example, the partition 59 has a flat plate shape. The circuit accommodating space 517 is defined as a space enclosing by the first side wall 51E, the second side wall 51F, the third side wall 51D, and the partition 59. The relay accommodating space 518 is defined as a space enclosing by the first side wall 51E, the second side wall 51F, the fourth side wall 51C, and the partition 59.

Figure 12:
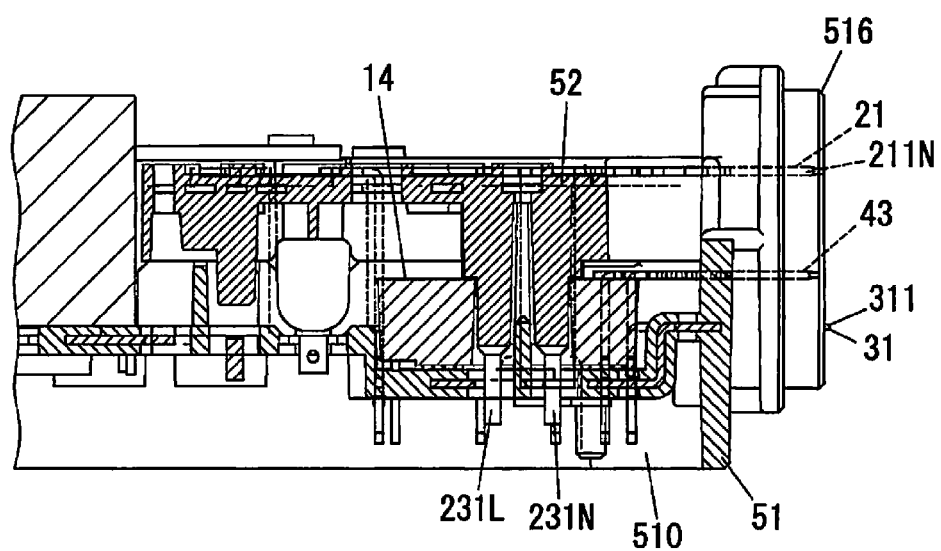
FIG. 12 is a sectional view illustrating the primary part.

The zero-phase current transformer 14 has a ring shape and is oriented such that an axial direction thereof is identical to the upward and downward direction. As shown in FIG. 12, the intermediate conductors 23 and the second grounding conductor 32 are inserted in the zero-phase current transformer 14. Note that, with regard to the intermediate conductors 23 and the second grounding conductor 32, only the intermediate conductors 23 are shown in FIG. 12. In a state in which an electric leakage has not occurred, since magnetic fields generated by the respective intermediate conductors 23 cancel each other, an induction current is not generated in the zero-phase current transformer 14. When an electric leakage occurs, the two magnetic fields fail to cancel each other and thus an induction current is generated in the zero-phase current transformer 14.

The control circuit 12 determines whether or not an electric leakage has occurred based on the induction current, and turns off the relays 11 upon determining that an electric leakage has occurred (that is, when the electric leakage has been detected). In brief, the control circuit 12 is configured to, upon detecting an electrical leakage by the zero-phase current transformer 14, control the set of relays 11 to break the electrical connections between the set of intermediate conductors 23 and the set of power supply conductors 22.

Moreover, as shown in FIG. 1, the control circuit 12 is electrically connected to one of the connection conductors 24 so as to enable performing an operation test of the zero-phase current transformer 14 by applying a current for simulating the electric leakage.

The power supply control device of the present embodiment includes the set of power reception conductors 21, the set of power supply conductors 22, the set of intermediate conductors 23, the set of relays 11, the zero-phase current transformer 14, the control circuit 12, the first block 51, and the second block 52. The set of power reception conductors 21 are to be electrically connected to an external power source. The set of power supply conductors 22 are to be electrically connected to a charging circuit of an automobile including a battery and the charging circuit for charging the battery. The set of intermediate conductors 23 are electrically connected to the power reception conductors 21, respectively. The set of relays 11 are configured to open and close conducting paths between the power supply conductors 22 and the intermediate conductors 23, respectively. The intermediate conductors 23 are inserted through the zero-phase current transformer 14. The control circuit 12 is configured to open the relays 11 in response to detection of an electrical leakage by the zero-phase current transformer 14. The first block 51 is a block to which the power reception conductors 21 and the power supply conductors 22 are fixed. The second block 52 is a block to which the intermediate conductors 23 are fixed.

Further, the power supply control device of the present embodiment includes the cable (7, 8) including a set of power lines, and the plug including a set of contact terminals (73, 83) electrically connected to the set of power lines respectively. At least one of the power reception conductor 21 and the power supply conductor 22 are formed of a metal plate and are to be in physical and electrical contact with the contact terminal (73, 83).

In other words, the power supply control device of the present embodiment involves the following first feature.

According to the first feature, the power supply control device includes: the set of power reception conductors 21 for receiving power; the set of power supply conductors 22 for supplying power; the set of intermediate conductors 23; the set of relays 11; the zero-phase current transformer 14; the control circuit 12; and the body block 5. The set of intermediate conductors 23 are electrically connected to the set of power reception conductors 21, respectively. The set of relays 11 are configured to make and break electrical connections between the set of intermediate conductors 23 and the set of power supply conductors 22, respectively. The zero-phase current transformer 14 is positioned to allow the set of intermediate conductors 23 to pass through the inside of the zero-phase current transformer 14. The control circuit 12 is configured to, upon detecting an electrical leakage by the zero-phase current transformer 14, control the set of relays 11 to break the electrical connections between the set of intermediate conductors 23 and the set of power supply conductors 22. The body block 5 holds the set of power reception conductors 21, the set of power supply conductors 22, and the set of intermediate conductors 23. The body block 5 includes the first block 51 and the second block 52 fixed to the first block 51. The set of power reception conductors 21 and the set of power supply conductors 22 are fixed to the first block 51. The set of intermediate conductors 23 is fixed to the second block 52.

Further, the power supply control device of the present embodiment includes the following second and third features. Besides, the second and third features are optional.

According to the second feature, in addition to the first feature, the zero-phase current transformer 14 is positioned between the first block 51 and the second block 52.

According to the third feature, in addition to the first or second feature, the power supply control device further includes the housing 6 accommodating the body block 5. The first block 51 is fixed to the housing 6. The second block 52 is not fixed to the housing 6 directly.

Furthermore, the power supply control device of the present embodiment includes the following fourth to eleventh features. Besides, the fourth to eleventh features are optional.

According to the fourth feature, in addition to any one of the first to third features, each of the set of power reception conductors 21 is formed of a metal plate, and includes a power reception terminal 211 for receiving power.

According to the fifth feature, in addition to the fourth feature, each of the power reception terminals 211 of the set of power reception conductors 21 has a shape allowing mechanical connection with a contact terminal 73 of a predetermined plug 71.

According to the sixth feature, in addition to the fourth or fifth feature, each of the set of power reception conductors 21 includes the first connection terminal 212 and is embedded in the first block 51 such that the power reception terminal 211 and the first connection terminal 212 are exposed. The set of intermediate conductors 23 are electrically connected to the first connection terminals 212 of the set of power reception conductors 21, respectively.

According to the seventh feature, in addition to the sixth feature, each of the set of power supply conductors 22 is formed of a metal plate, and includes the power supply terminal 221 for supplying power.

According to the eighth feature, in addition to the seventh feature, each of the power supply terminals 221 of the set of power supply conductors 22 has a shape allowing mechanical connection with the contact terminal 82 of the predetermined plug 81.

According to the ninth feature, in addition to the seventh or eighth feature, each of the set of power supply conductors 22 includes the second connection terminal 222 and is embedded in the first block 51 such that the power supply terminal 221 and the second connection terminal 222 are exposed. The set of relays 11 are interposed between the set of intermediate conductors 23 and the second connection terminals 222 of the set of power supply conductors 22, respectively.

According to the tenth feature, in addition to the ninth feature, each of the set of intermediate conductors 23 is formed of a metal plate, and includes the third connection terminal 231 and the fourth connection terminal 232. Each of the set of intermediate conductors 23 is embedded in the second block 52 such that the third connection terminal 231 and the fourth connection terminal 232 are exposed. The third connection terminals 231 of the set of intermediate conductors 23 are electrically connected to the first connection terminals 212 of the set of power reception conductors 21, respectively. The set of relays 11 are interposed between the fourth connection terminals 232 of the set of intermediate conductors 23 and the second connection terminals 222 of the set of power supply conductors 22, respectively.

According to the eleventh feature, in addition to the tenth feature, the power supply control device further includes the set of connection conductors 24. Each of the set of connection conductors 24 is formed of a metal plate, and includes the fifth connection terminal 241 and the sixth connection terminal 242. Each of the set of connection conductors 24 is embedded in the first block 51 such that the fifth connection terminal 241 and the sixth connection terminal 242 are exposed. The fourth connection terminals 232 of the set of intermediate conductors 23 are electrically connected to the fifth connection terminals 241 of the set of connection conductors 24, respectively. The set of relays 11 are interposed between the sixth connection terminals 242 of the set of connection conductors 24 and the second connection terminals 222 of the set of power supply conductors 22, respectively.

Alternatively, the power supply control device of the present embodiment includes the twelfth and thirteenth features instead of the fourth to eleventh features. Besides, the twelfth and thirteenth features are optional.

According to the twelfth feature, in addition to any one of the first to third features, each of the set of power supply conductors 22 is formed of a metal plate, and includes the power supply terminal 221 for supplying power.

According to the thirteenth feature, in addition to the twelfth feature, each of the power supply terminals 221 of the set of power supply conductors 22 has a shape allowing mechanical connection with the contact terminal 83 of the predetermined plug 81.

Additionally, the power supply control device of the present embodiment includes the following fourteenth and fifteenth features. Besides, the fourteenth and fifteenth features are optional.

According to the fourteenth feature, in addition to any one of the first to thirteenth features, the power supply control device further includes: the first grounding conductor 31; and the second grounding conductor 32. Each of the first grounding conductor 31 and the second grounding conductor 32 is formed of a metal plate. The first grounding conductor 31 includes the first grounding terminal 311 for receiving power, the second grounding terminal 312 for supplying power, and the third grounding terminal 313 for detection of an electrical leakage. The first grounding conductor 31 is embedded in the first block 51 such that the first grounding terminal 311, the second grounding terminal 312, and the third grounding terminal 313 are exposed. The second grounding conductor 32 includes the fourth grounding terminal 321 and the fifth grounding terminal 322. The second grounding conductor 32 is embedded in the second block 52 such that the fourth grounding terminal 321 and the fifth grounding terminal 322 are exposed. The second grounding conductor 32 is positioned to pass through the inside of the zero-phase current transformer 14. The fourth grounding terminal 321 of the second grounding conductor 32 is electrically connected to the third grounding terminal 313 of the first grounding conductor 31. The fifth grounding terminal 322 of the second grounding conductor 32 is electrically connected to the control circuit 12.

According to the fifteenth feature, in addition to any one of the first to fourteenth features, the set of power reception conductors 21 is to be electrically connected to an external power source. The set of power supply conductors 22 is to be electrically connected to a charging circuit for charging a battery of an automobile.

According to the above configuration, the intermediate conductor 23 fixed to the second block 52 which is separate from the first block 51 is inserted through the zero-phase current transformer 14. Therefore, even when the power reception conductor 21 receives external force via the cable 7, displacement of the zero-phase current transformer 14 less occurs, compared with a case where the power reception conductor 21 is inserted through the zero-phase current transformer 14 or a case where the intermediate conductor 23 along with the power reception conductor 21 is directly fixed to the first block 51.

For example, there may be a structure in which blades to be in physical and electrical contact with the contact terminals 73 and 83 of the device-side plugs 71 and 81 are provided separately from the power reception conductors 21 and the power supply conductors 22. In this structure, it is necessary to electrically connect the blades to the power reception conductors 21 and the power supply conductors 22 via electric wires or the like. Therefore, the above structure may induce a risk of disconnection between the blades and the conductors 21 and 22 and accordingly may increase a risk of disconnection in the whole. In contrast, according to the present embodiment, the power reception conductors 21 and the power supply conductors 22 are in direct contact with the contact terminals 73 and, therefore, a risk of disconnection is more reduced than the above case.

The invention claimed is:

1. A power supply control device, comprising:
a set of power reception conductors for receiving power;
a set of power supply conductors for supplying power;
a set of intermediate conductors electrically connected to the set of power reception conductors, respectively;
a set of relays configured to make and break electrical connections between the set of intermediate conductors and the set of power supply conductors, respectively;
a zero-phase current transformer positioned to allow the set of intermediate conductors to pass through an inside of the zero-phase current transformer;
a control circuit configured to, upon detecting an electrical leakage by the zero-phase current transformer, control the set of relays to break the electrical connections between the set of intermediate conductors and the set of power supply conductors; and
a body block holding the set of power reception conductors, the set of power supply conductors, and the set of intermediate conductors,
wherein:
the body block includes a first block and a second block fixed to the first block;
the set of power reception conductors and the set of power supply conductors are fixed to the first block;
the set of intermediate conductors is fixed to the second block;
each of the set of power reception conductors is formed of a metal plate and includes a power reception terminal for receiving power; and
each of the power reception terminals of the set of power reception conductors has a shape allowing mechanical connection with a contact terminal of a predetermined plug.

2. The power supply control device according to claim 1, wherein
the zero-phase current transformer is positioned between the first block and the second block.

3. The power supply control device according to claim 1, further comprising a housing accommodating the body block, wherein:
the first block is fixed to the housing; and
the second block is not fixed to the housing directly.

4. The power supply control device according to claim 1, wherein
each of the set of power supply conductors is formed of a metal plate and includes a power supply terminal for supplying power; and
each of the power supply terminals of the set of power supply conductors has a shape allowing mechanical connection with a contact terminal of a predetermined plug.

5. The power supply control device according to claim 1, wherein:
the set of power reception conductors is to be electrically connected to an external power source; and
the set of power supply conductors is to be electrically connected to a charging circuit for charging a battery of an automobile.

6. A power supply control device, comprising:
a set of power reception conductors for receiving power;
a set of power supply conductors for supplying power;
a set of intermediate conductors electrically connected to the set of power reception conductors, respectively;
a set of relays configured to make and break electrical connections between the set of intermediate conductors and the set of power supply conductors, respectively;
a zero-phase current transformer positioned to allow the set of intermediate conductors to pass through an inside of the zero-phase current transformer;
a control circuit configured to, upon detecting an electrical leakage by the zero-phase current transformer, control the set of relays to break the electrical connections between the set of intermediate conductors and the set of power supply conductors; and
a body block holding the set of power reception conductors, the set of power supply conductors, and the set of intermediate conductors,
wherein:
the body block includes a first block and a second block fixed to the first block;
the set of power reception conductors and the set of power supply conductors are fixed to the first block;
the set of intermediate conductors is fixed to the second block;
each of the set of power reception conductors is formed of a metal plate and includes a power reception terminal for receiving power;
each of the set of power reception conductors includes a first connection terminal and is embedded in the first block such that the power reception terminal and the first connection terminal are exposed; and
the set of intermediate conductors are electrically connected to the first connection terminals of the set of power reception conductors, respectively.

7. The power supply control device according to claim 6, wherein
each of the set of power supply conductors:
is formed of a metal plate; and
includes a power supply terminal for supplying power.

8. The power supply control device according to claim 7, wherein
each of the power supply terminals of the set of power supply conductors has a shape allowing mechanical connection with a contact terminal of a predetermined plug.

9. The power supply control device according to claim 7, wherein:
each of the set of power supply conductors includes a second connection terminal and is embedded in the first block such that the power supply terminal and the second connection terminal are exposed;
the set of relays are interposed between the set of intermediate conductors and the second connection terminals of the set of power supply conductors, respectively.

10. The power supply control device according to claim 9, wherein
each of the set of intermediate conductors
is formed of a metal plate,
includes a third connection terminal and a fourth connection terminal, and
is embedded in the second block such that the third connection terminal and the fourth connection terminal are exposed;
the third connection terminals of the set of intermediate conductors are electrically connected to the first connection terminals of the set of power reception conductors, respectively; and
the set of relays are interposed between the fourth connection terminals of the set of intermediate conductors and the second connection terminals of the set of power supply conductors, respectively.

11. The power supply control device according to claim 10, further comprising a set of connection conductors,
wherein:
each of the set of connection conductors
is formed of a metal plate,
includes a fifth connection terminal and a sixth connection terminal, and
is embedded in the first block such that the fifth connection terminal and the sixth connection terminal are exposed;
the fourth connection terminals of the set of intermediate conductors are electrically connected to the fifth connection terminals of the set of connection conductors, respectively; and
the set of relays are interposed between the sixth connection terminals of the set of connection conductors and the second connection terminals of the set of power supply conductors, respectively.

12. The power supply control device according to claim 6, wherein
the zero-phase current transformer is positioned between the first block and the second block.

13. The power supply control device according to claim 6, further comprising a housing accommodating the body block, wherein:
the first block is fixed to the housing; and
the second block is not fixed to the housing directly.

14. The power supply control device according to claim 6, wherein
each of the set of power supply conductors is formed of a metal plate and includes a power supply terminal for supplying power; and
each of the power supply terminals of the set of power supply conductors has a shape allowing mechanical connection with a contact terminal of a predetermined plug.

15. The power supply control device according to claim 6, wherein:
the set of power reception conductors is to be electrically connected to an external power source; and
the set of power supply conductors is to be electrically connected to a charging circuit for charging a battery of an automobile.

16. A power supply control device, comprising:
a set of power reception conductors for receiving power;
a set of power supply conductors for supplying power;
a set of intermediate conductors electrically connected to the set of power reception conductors, respectively;
a set of relays configured to make and break electrical connections between the set of intermediate conductors and the set of power supply conductors, respectively;
a zero-phase current transformer positioned to allow the set of intermediate conductors to pass through an inside of the zero-phase current transformer;
a control circuit configured to, upon detecting an electrical leakage by the zero-phase current transformer, control the set of relays to break the electrical connections between the set of intermediate conductors and the set of power supply conductors; and
a body block holding the set of power reception conductors, the set of power supply conductors, and the set of intermediate conductors,
wherein:
the body block includes a first block and a second block fixed to the first block;
the set of power reception conductors and the set of power supply conductors are fixed to the first block;
the set of intermediate conductors is fixed to the second block; and
the power supply control device further comprises:
a first grounding conductor; and
a second grounding conductor,
wherein:
each of the first grounding conductor and the second grounding conductor is formed of a metal plate;
the first grounding conductor
includes a first grounding terminal for receiving power, a second grounding terminal for supplying power, and a third grounding terminal for detection of an electrical leakage, and
is embedded in the first block such that the first grounding terminal, the second grounding terminal, and the third grounding terminal are exposed;
the second grounding conductor
includes a fourth grounding terminal and a fifth grounding terminal, and
is embedded in the second block such that the fourth grounding terminal and the fifth grounding terminal are exposed;
the second grounding conductor is positioned to pass through the inside of the zero-phase current transformer;
the fourth grounding terminal of the second grounding conductor is electrically connected to the third grounding terminal of the first grounding conductor; and
the fifth grounding terminal of the second grounding conductor is electrically connected to the control circuit.

17. The power supply control device according to claim 16, wherein
the zero-phase current transformer is positioned between the first block and the second block.

18. The power supply control device according to claim 16, further comprising a housing accommodating the body block, wherein:
the first block is fixed to the housing; and
the second block is not fixed to the housing directly.

19. The power supply control device according to claim 16, wherein
each of the set of power supply conductors is formed of a metal plate and includes a power supply terminal for supplying power; and
each of the power supply terminals of the set of power supply conductors has a shape allowing mechanical connection with a contact terminal of a predetermined plug.

20. The power supply control device according to claim 16, wherein
the set of power reception conductors is to be electrically connected to an external power source; and
the set of power supply conductors is to be electrically connected to a charging circuit for charging a battery of an automobile.

* * * * *